Sept. 10, 1940. W. O. SCHULTZ Re. 21,563

FUSE

Original Filed Jan. 10, 1935 2 Sheets-Sheet 1

INVENTOR.
William O. Schultz
BY
Arthur R. Woolfolk
ATTORNEY.

FUSE

Original Filed Jan. 10, 1935 2 Sheets-Sheet 2

INVENTOR.
William O. Schultz
BY
Arthur R. Woodcock
ATTORNEY.

Reissued Sept. 10, 1940

Re. 21,563

UNITED STATES PATENT OFFICE 21,563

FUSE

William O. Schultz, South Milwaukee, Wis., assignor to Line Material Company, South Milwaukee, Wis., a corporation of Delaware Original No. 2,098,433, dated November 9, 1937, Serial No. 1,084, January 10, 1935. Application for reissue June 27, 1938, Serial No. 216,189

22 Claims. (Cl. 200—116)

This invention relates to fuses, particularly of the expulsion type.

In expulsion fuses it is well known that when a sudden overload occurs, gas pressure builds up very rapidly in the fuse tube and expels any remaining portion of the fuse link that has not been wholly consumed due to the arc formed within the fuse tube. However, when a very slowly applied relatively small overload occurs, it is obvious that the fuse link is severed but nevertheless there is not that sudden generation of pressure mentioned hereinabove with the consequence that frequently portions of the fuse link remain intact and there is a chance for leakage along the inner surface of the fuse tube which may cause gradual carbonization on the one hand, or radio interference on the other. Additionally, where drop-out fuses are provided in which the fuse tube is retained in position by the fuse link, it is desirable to have the fuse link wholly expelled from the fuse tube so that the mechanism controlling the dropping out of the fuse can freely function.

This invention is designed to overcome the above noted defects, and objects of this invention are to provide a novel form of expulsion fuse in which means are provided which tend to withdraw the fuse link from the open end of the fuse tube but in which this means is restrained from functioning as long as the fuse link is intact, the means, however, becoming effective as soon as the fuse link is severed so that it will function to pull out any remaining portion of the fuse link and thereby insure quick clearing of the fuse.

Further objects are to provide a novel form of drop-out fuse in which the means for withdrawing any remaining portion of the fuse link when the fuse link is ruptured also is effective to hold the fuse tube against outward motion so that as soon as the fuse link is severed, this means withdraws any remaining portion thereof in a very quick manner and also positively releases the fuse allowing it to drop from operative to inoperative position.

Further objects are to provide a fuse withdrawing means for an expulsion fuse of the drop-out type in which a very simple construction is employed, which provides not only the resiliency urging the fuse retracting member towards fuse retracting position, but also serves as a very simple locking means for locking the fuse in place, the member being so constructed that it may be made of small size relatively to the remaining portion of the fuse structure, so that it does not needlessly enlarge or complicate the apparatus, and to provide means which takes the strain or force, due to the recoil of the fuse, at the time of blowing and thus does not load the fuse retracting member with this additional strain, the fuse retracting member merely having a relatively small strain or force, due to the fact that it holds the fuse tube against downward dropping or sliding motion.

An embodiment of the invention is shown in the accompanying drawings, in which.

Figure 1:
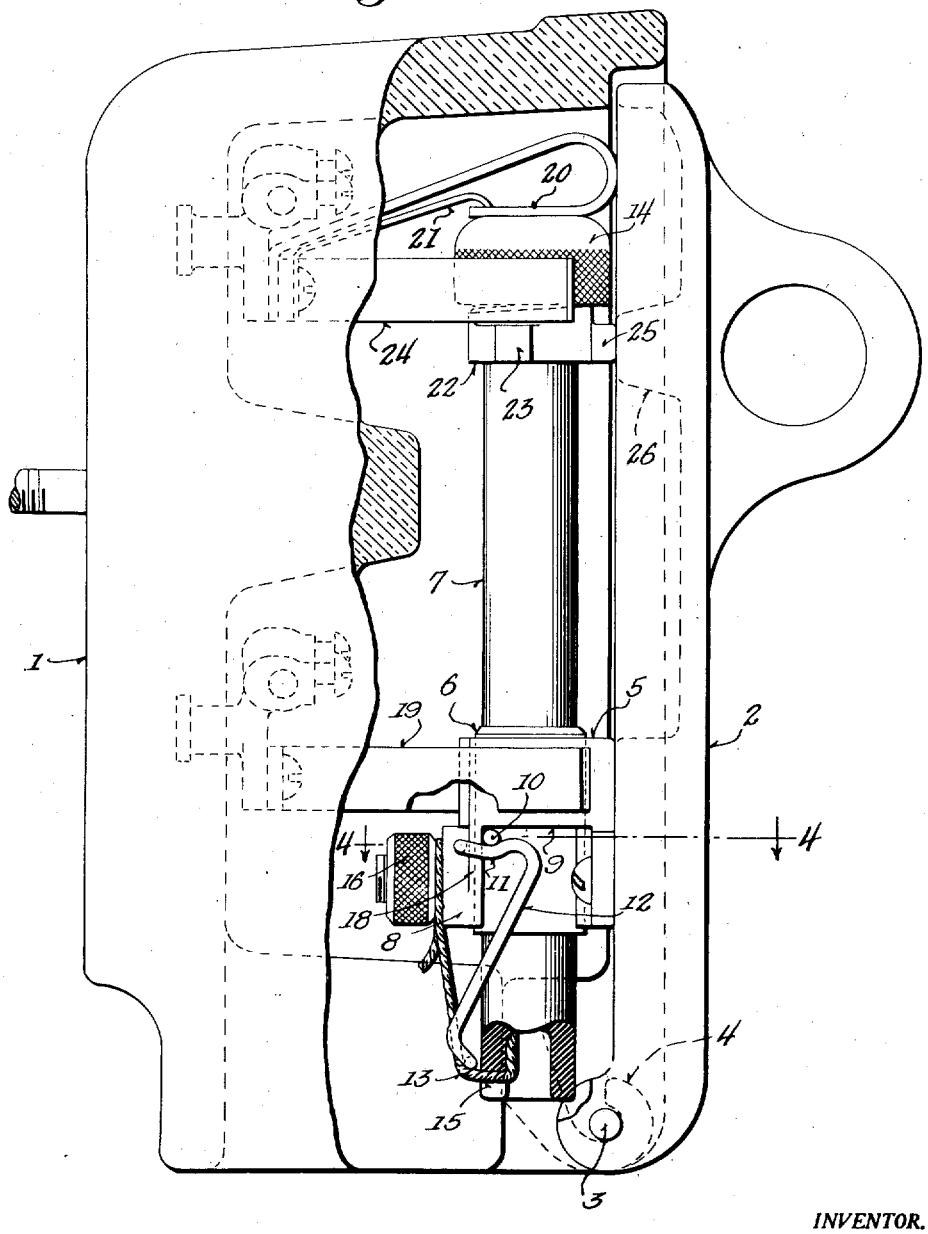
Figure 1 is a side elevation of the fuse construction with parts broken away and in section.

The fuse construction comprises a housing 1 of insulating material, such, for instance, as porcelain, and provided with a door 2 which may be of any suitable insulating material, such as a phenolic condensation compound. The door is provided with a pair of pintle pins 3 which are removably carried by hook-like supporting members 4 rigid with the housing 1 but electrically distinct from all contacts therein.

The door is provided with a rigidly mounted contact member 5 which in reality is of sleeve-like construction and receives the sleeve 6 which is rigidly carried by the fuse tube 7. The sleeve 6 may be formed of metal, as indicated particularly in Figure 4.

The stationary contact 5 is provided with a downwardly projecting or overhanging portion 8 so that in effect a cut-out or shouldered portion is provided, the shouldered portion being indicated by the reference character 9.

Figure 3:
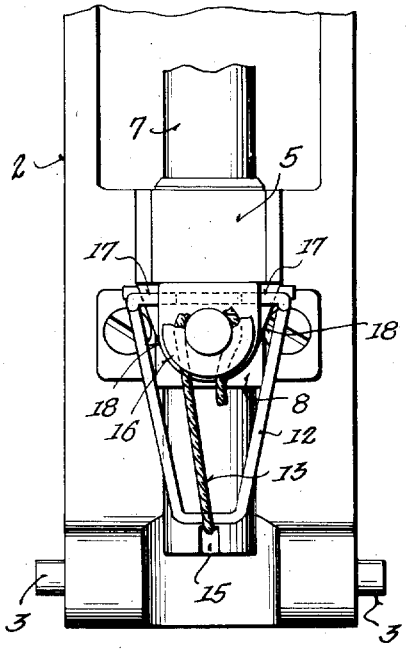
Figure 3 is a fragmentary face view of the inner portion of the door and associated parts prior to the blowing of the fuse.
Figure 4:
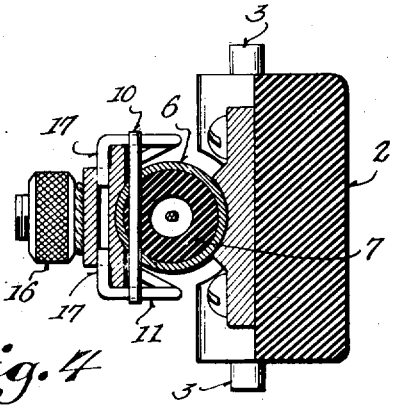
Figure 4 is an enlarged sectional view on the line 4—4 of Figure 1.

A pin 10 projects through the sleeve or member 6 which is rigidly carried by the fuse tube, as is apparent from Figure 4, and extends on opposite sides of the fuse tube. Normally the pin is in contact with the shoulder 9, as shown in Figure 1. The pin is engaged by the supporting arms 11 of a fuse link retracting the fuse tube restraining member 12. The lower or bail portion of this member is held in place normally by the fuse link 13 which extends from the upper contact 14 of the fuse tube through a slot 15 which may be provided, if desired, in the lower end of the fuse tube and is clamped against the extension 8 of the contact 5 by means of a thumb nut or other clamping member 16, as most clearly shown in Figures 1 and 3.

The member 12 is formed of springy material and has inturned ends 17, as shown in Figure 3, which are pivoted in the projecting portion 8 of the stationary contact 5. The arms 12 are spring urged, due to the inherent resiliency of the material of which they are formed, towards each other but the arms 11 integral with the arms 12 are spread apart by the slanting surface 18 formed on the sides of the projecting portion 8, as shown most clearly in Figure 3. This causes the spring arms 12 to tend to rock in a clockwise direction so that the arms 11 may ride downwardly on the slanting surfaces 18.

The housing is provided with a lower stationary contact which consists of a pair of spaced arms 19 between which the contact 5 is thrust when the door is rocked to closed position, as shown in Figure 1.

The housing is also provided with an upper spring contact 20 which has an inturned end and which has an assisting spring 21 bearing on the inturned end and urging the contact 20 downwardly into good electrical contact with the upper contact 14 of the fuse tube 7. The fuse tube is provided with an upper collar 22 which has projecting ears 23 which are normally located below a U-shaped stop 24 rigidly supported from the upper contact of the structure. The stop 24, therefore, engages the ears 23 when the fuse tends to recoil upwardly during the blowing thereof and thus prevents upward displacing movement of the fuse tube and takes the strain off the upper spring contact and off of the pins 10. The collar 22 may be provided with a projecting tongue 25 which bears against the inwardly projecting boss 26 formed on the door.

Figure 2:
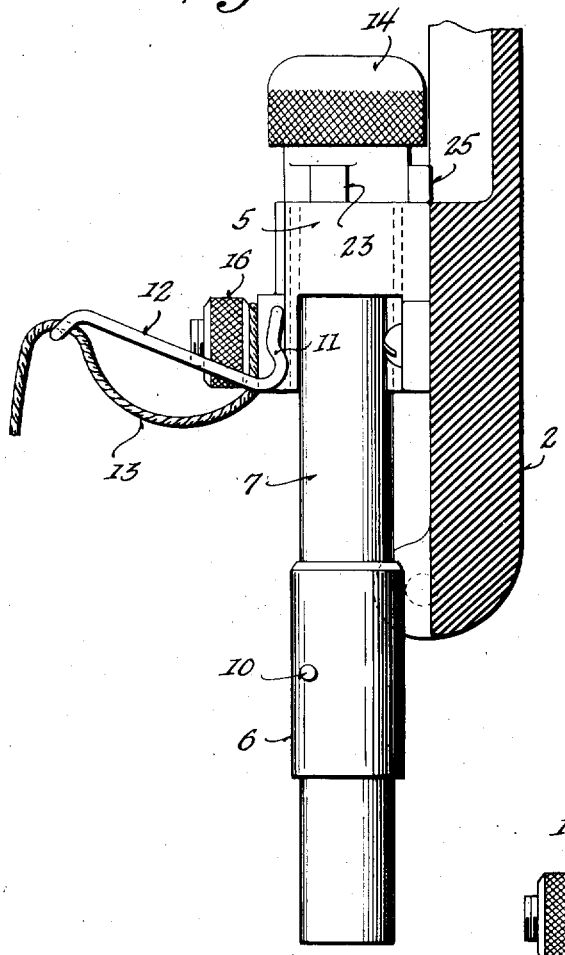
Figure 2 is a fragmentary detail of the lower portion of the door showing the fuse tube in its lowermost position after the fuse has blown.

Assuming that the fuse blows, it is apparent that the rupturing of the fuse link 13 releases the spring member 12 so that this spring urged member rocks into the position shown in Figure 2 and thus releases the pins 10. This allows the fuse tube 7 to slide downwardly into the position shown in Figure 2. However, the spring contact 20 of the stationary upper contact follows the upper contact 14 of the fuse tube downwardly a slight distance and thus maintains contact for a certain length of time sufficient for the fuse tube to clear itself prior to the separation of the contact 14 from the contact 20.

Additionally, assume that a very small and gradually applied overload is impressed on the fuse. Under these conditions it may be possible that the fuse link will not be wholly expelled as there may not then be a violent generation of pressure within the fuse tube. However, the spring member 12 will retract any remaining portion of the fuse link and thus cause the arc to be completely extinguished within the fuse tube even under these unusual conditions. At all events the spring member 12 serves to quickly pull out any remaining portion of the fuse link as well as to release the pins 10 and allow the downward sliding of the fuse tube.

It will be seen that a very simple and serviceable type of drop-out fuse has been provided by this invention which leaves the cover in closed position after the fuse blows, but which will give a visual indication of the condition of the fuse as the fuse tube slides downwardly and projects below the lower portion of the casing after blowing of the fuse. However, the interior of the casing is protected against the weather as the door remains closed.

It will be seen further that the invention provides a means for very quickly withdrawing any remaining portion of the fuse link in a positive manner and that the mechanism for withdrawing the fuse link is of simple construction, easily produced, and reliable in operation.

Although this invention has been described in considerable detail, it is to be understood that such description is intended as illustrative rather than limiting, as the invention may be variously embodied and is to be interpreted as claimed.

I claim:

1. An expulsion fuse comprising a fuse tube having an open end, a fuse link within said fuse tube, and fuse link retracting means comprising a U-shaped pivoted member normally partially straddling said fuse tube and having a bail portion over which said fuse link is looped after passing from the open end of said fuse tube, said U-shaped pivoted member being resiliently urged to rock outwardly away from said fuse tube to thereby retract said fuse link, said U-shaped member being resiliently held in its outward position away from said fuse tube after said fuse link has been ruptured.

2. An expulsion fuse comprising a fuse tube having a closed end and an open end a U-shaped pivoted member normally straddling said fuse tube and having a bail portion, said member being resiliently urged away from said fuse tube and having its free inturned ends pivotally carried adjacent said fuse tube, and a fuse link extending through said fuse tube and out of the open end thereof and over said bail portion to thereby hold said U-shaped member from outward swinging motion, said U-shaped pivoted member being resiliently held away from said fuse tube after said fuse link has been ruptured.

3. An expulsion fuse comprising a fuse tube having an open end, a fuse link threaded through said fuse tube and extending outwardly through said open end, means for holding the free end of said fuse link, a U-shaped spring member having a bail portion over which said fuse link is looped exteriorly of said tube and having inturned ends pivotally mounted adjacent the means for holding the free end of the fuse link, said U-shaped member having spring arms tending to approach each other, and cam means spreading said arms apart when said U-shaped member is rocked towards the fuse tube.

4. An expulsion fuse comprising a fuse tube having an upper contact and having an open end, a lower contact spaced upwardly from the lower open end of the fuse tube, said lower contact having fuse link securing means and having a wedge-shaped cam portion, a U-shaped pivoted member having a bail portion normally located adjacent said fuse tube and having a pair of spring arms which ride on the wedge-shaped cam portion of said lower contact, and a fuse link extending from said upper contact through said fuse tube outwardly through the lower end thereof and over the bail portion of said U-shaped member to said lower contact and normally holding said U-shaped member against outward rocking motion.

5. An expulsion fuse comprising a fuse tube having an upper contact, a lower contact spaced from the lower end of said fuse tube, the lower end of said fuse tube being open, a fuse link extending from the upper contact to the lower contact and looped outwardly through the lower end of said fuse tube, said upper contact being carried by said fuse tube and said lower contact being carried by a relatively stationary member independently of said fuse tube, a pivoted U-shaped member carried by said lower contact and spring urged outwardly away from said fuse tube and having a bail portion over which said fuse link is looped after passing from the open lower end of said fuse tube, whereby when said fuse link is severed, said U-shaped member rocks outwardly and retracts any remaining portion of the fuse link.

6. A drop-out fuse comprising supporting means having a stationary upper contact and a lower contact, a fuse tube having an upper contact normally engaging the stationary upper contact of said supporting means and having an open lower end, a fuse link extending from the upper contact of said fuse tube through said fuse tube and outwardly from the lower end thereof to said lower contact, said fuse tube being slidably carried by the lower contact, a fuse link retracting member pivotally carried by said lower contact and yieldingly urged outwardly from said fuse tube and over which said fuse link is looped, said member having means normally restraining said fuse tube from downward sliding motion and releasable upon blowing of said fuse link.

7. An expulsion fuse comprising a housing, a door for said housing, stationary upper and lower contacts carried by said housing, a lower contact carried by said door and normally engaging the lower contact of said housing, a fuse tube having an upper contact normally engaging the upper contact of said housing and having an open lower end, a fuse link extending from the upper contact of said fuse tube through said fuse tube and outwardly from the lower end thereof to the contact carried by said door, said fuse tube being slidably mounted within the contact of said door and the upper contact of said fuse tube being movable away from the upper stationary contact, a fuse link retracting member pivotally mounted on the lower contact carried by said door and yieldingly urged towards outward rocking motion, the fuse link being looped over said member, and means carried by said fuse tube and engaging said member and normally restraining said fuse tube from outward sliding motion.

8. An expulsion fuse comprising a housing, a door for said housing, stationary upper and lower contacts carried by said housing, a lower contact carried by said door and normally engaging the lower contact of said housing, a fuse tube having an upper contact normally engaging the upper contact of said housing and having an open lower end, a fuse link extending from the upper contact of said fuse tube through said fuse tube and outwardly from the lower end thereof to the contact carried by said door, said fuse tube being slidably mounted within the contact of said door and the upper contact of said fuse tube being movable away from the upper stationary contact, a fuse link retracting member pivotally mounted on the lower contact carried by said door and yieldingly urged towards outward rocking motion, the fuse link being looped over said member, and means carried by said fuse tube and engaging said member and normally restraining said fuse tube from outward sliding motion, said door being removably pivotally carried by said housing.

9. An expulsion fuse comprising a fuse tube having an upper contact rigid therewith, an upper stationary contact normally engaging the upper contact of said fuse tube, a lower contact spaced from the lower end of said fuse tube, said lower contact being carried by a relatively stationary member independently of said fuse tube and having fuse link clamping means, said fuse tube being open adjacent its lower end, a fuse link extending through the fuse tube from the upper contact to the lower contact and clamped by said fuse link clamping means, said fuse tube being movable with respect to said lower contact, and a pivoted resiliently urged member carried by said lower contact and around which said fuse link is looped, said pivoted member having means normally retaining said fuse tube against outward motion.

10. A drop-out fuse comprising a housing having stationary upper and lower contacts and having a door, a fuse tube having an upper contact normally engaging the upper contact of said housing, and movable downwardly away therefrom, a lower contact carried by said door and normally engaging the lower stationary contact of said housing, said fuse tube being slidably mounted within the lower contact of said door, a fuse link extending from the upper contact of said fuse tube through said fuse tube outwardly from the lower end thereof to the contact of said door, fuse link securing means carried by the lower contact of said door, a fuse link retracting means comprising a U-shaped member having inturned ends pivoted to the contact of said door and having shouldered portions adjacent the inturned ends and having a bail portion over which said fuse link is looped, said U-shaped member being resiliently urged towards rocking motion away from said fuse tube, and projecting means carried by said fuse tube and normally resting on the shouldered portions of said U-shaped member.

11. A drop-out fuse comprising a housing having stationary upper and lower contacts and having a door, a fuse tube having an upper contact normally engaging the upper contact of said housing, and movable downwardly away therefrom, a lower contact carried by said door and normally engaging the lower stationary contact of said housing, said fuse tube being slidably mounted within the lower contact of said door, a fuse link extending from the upper contact of said fuse tube through said fuse tube outwardly from the lower end thereof to the contact of said door, fuse link securing means carried by the lower contact of said door, a fuse link retracting means comprising a U-shaped member having inturned ends pivoted to the contact of said door and having shouldered portions adjacent the inturned ends and having a bail portion over which said fuse link is looped, said U-shaped member being resiliently urged towards rocking motion away from said tube, and projecting means carried by said fuse tube and normally resting on the shouldered portions of said U-shaped member, said housing and said fuse tube having cooperating means to restrain said fuse tube against upward recoiling motion.

12. A drop-out fuse comprising a housing having stationary upper and lower contacts and having a door, a fuse tube having an upper contact normally engaging the upper contact of said housing, and movable downwardly away therefrom, a lower contact carried by said door and normally engaging the lower stationary contact of said housing, said fuse tube being slidably mounted within the lower contact of said door, a fuse link extending from the upper contact of said fuse tube through said fuse tube outwardly from the lower end thereof to the contact of said door, fuse link securing means carried by the lower contact of said door, a fuse link retracting means comprising a U-shaped member having inturned ends pivoted to the contact of said door and having shouldered portions adjacent the inturned ends and having a bail portion over which said fuse link is looped, said U-shaped member being resiliently urged towards rocking motion away from said fuse tube, and projecting means carried by said fuse tube and normally resting on the shouldered portions of said U-shaped member, the upper contact of said housing being yieldingly urged downwardly into normal firm engagement with the upper contact of said fuse tube.

13. A drop-out fuse comprising a housing having stationary upper and lower contacts and having a door, a fuse tube having an upper contact normally engaging the upper contact of said housing, and movable downwardly away therefrom, a lower contact carried by said door and normally engaging the lower stationary contact of said housing, said fuse tube being slidably mounted within the lower contact of said door, a fuse link extending from the upper contact of said fuse tube through said fuse tube outwardly from the lower end thereof to the contact of said door, fuse link securing means carried by the lower contact of said door, a fuse link retracting means comprising a U-shaped member having inturned ends pivoted to the contact of said door and having shouldered portions adjacent the inturned ends and having a bail portion over which said fuse link is looped, said U-shaped member being resiliently urged towards rocking motion away from said fuse tube, and projecting means carried by said fuse tube and normally resting on the shouldered portions of said U-shaped members, said fuse tube having means adapted to bear against the inner upper portion of said door to hold said fuse tube in alignment with respect to said door.

14. A drop-out fuse comprising a housing having stationary upper and lower contacts, a door for said housing having a lower contact normally engaging the lower contact of said housing, a fuse tube having an open lower end and having an upper contact normally engaging the stationary upper contact of said housing and slidable through the contact of said door, said fuse tube having pins projecting from opposite sides thereof, a fuse link extending from the upper contact of said fuse tube through said fuse tube and outwardly from the lower end thereof to the contact of said door, means carried by the contact of said door for locking the free end of the fuse link thereto, and a U-shaped spring member normally straddling said fuse tube and having a bail portion over which said fuse link is passed, said U-shaped member being pivotally mounted on the lower contact of said door, the lower contact of said door having a downwardly projecting wedge-shaped cam member normally spreading the arms of said U-shaped spring member apart, said U-shaped member having shouldered portions upon which said pins normally rest.

15. A drop-out fuse comprising a housing having a door and having upper and lower contacts, said door having a contact normally engaging the lower contact of said housing, the contact of said door being of sleeve-like formation and having fuse link clamping means, the contact of said door having a downwardly projecting wedge-shaped cam member, a U-shaped resilient member having inturned ends pivoted in the contact of said door and having transversely extending portions riding on the downwardly extending wedge-shaped cam member and having a bail portion, and a fuse tube having an upper contact normally engaging the upper contact of said housing and having a lower open end, a fuse link within said fuse tube extending from the upper contact through the fuse tube over the bail of said U-shaped member and having its free end secured by the clamping means of the contact of said door, said fuse tube having projecting portions normally resting upon the transverse portions of said U-shaped member, said fuse tube being slidably mounted within the contact of said door.

16. An expulsion fuse construction comprising a contact, a guide, a fuse tube slidable through said guide and having a contact normally engaging said first mentioned contact and movable from said first mentioned contact when said fuse tube slides with respect to said guide, said fuse tube being normally biased towards sliding motion with respect to said guide, a fuse link within said fuse tube, a cam, and means resiliently cooperating with said cam and restrained by said fuse link for releasably holding said fuse tube against sliding motion with respect to said guide.

17. An expulsion fuse construction comprising a contact, a guide, a fuse tube slidable thorugh said guide and having a contact normally engaging said first mentioned contact and movable from said first mentioned contact when said fuse tube slides with respect to said guide, said fuse tube being normally biased towards sliding motion with respect to said guide, a fuse link within said fuse tube, a cam, and means resiliently cooperating with said cam for extracting said fuse link and for releasing said fuse tube when said fuse link is ruptured upon the occurrence of an overload.

18. In a drop-out fuse device, in combination, a sleeve, a fuse tube slidably mounted in said sleeve, a fuse link in said fuse tube, a lever rotatably mounted on said sleeve, said fuse link extending over said lever, and means mounted on said sleeve to secure said fuse link thereto for holding said lever in its normal position so as to restrain said fuse tube against sliding in said sleeve until said fuse link blows.

19. In a drop-out fuse device, in combination, a sleeve, a fuse tube slidably mounted in said sleeve, spring means biasing said fuse tube towards sliding motion relative to said sleeve, a fuse link in said fuse tube extending outside of said fuse tube at one end, a lever rotatably mounted on said sleeve, means projecting from said fuse tube operatively engaging said lever near its fulcrum point, said fuse link being positioned over said lever, and clamp means mounted on said sleeve to secure said fuse link thereto for holding said lever in such position as to prevent said fuse tube sliding in said sleeve under the influence of said spring means until said fuse link blows.

20. In a drop-out fuse device, in combination, a sleeve, a fuse tube slidable in said sleeve and having projecting means, a fuse link in said fuse tube, a lever rotatably mounted on said sleeve and having a portion extending substantially at right angles to the longitudinal axis of said fuse tube and normally engaging the projecting means of said fuse tube, said fuse link being looped over said lever and not fastened thereto, and means for anchoring said fuse link independently of said lever for holding the same in its normal position, thereby restraining said fuse tube from sliding in said sleeve until said fuse link blows.

21. In a drop-out fuse device, in combination, a sleeve, a fuse tube slidable in said sleeve and having an open end, a fuse link in said fuse tube, a lever rotatably mounted on said sleeve and having the free end adjacent the open end of said fuse tube, said fuse link extending out of the open end of said fuse tube and over the free end of said lever and not fastened thereto, and means for anchoring said fuse link independently of said lever for holding the same in its normal position, thereby restraining said fuse tube from sliding in said sleeve until said fuse link blows.

22. In a drop-out fuse device, in combination, a sleeve, a fuse tube slidably mounted in said sleeve, said fuse tube being biased towards sliding motion relative to said sleeve, a fuse link in said fuse tube extending outside of said fuse tube at one end, a lever rotatably mounted on said sleeve, means projecting from said fuse tube and operatively engaging said lever, said fuse link being looped over the free end of said lever and not fastened thereto, and means for anchoring said fuse link independently of said lever for holding said lever in its normal position.

WILLIAM O. SCHULTZ.